Nov. 27, 1951     J. C. CHILDS     2,576,105
BALANCING DEVICE FOR AIRCRAFT ROTORS
Filed Sept. 6, 1945     3 Sheets-Sheet 1
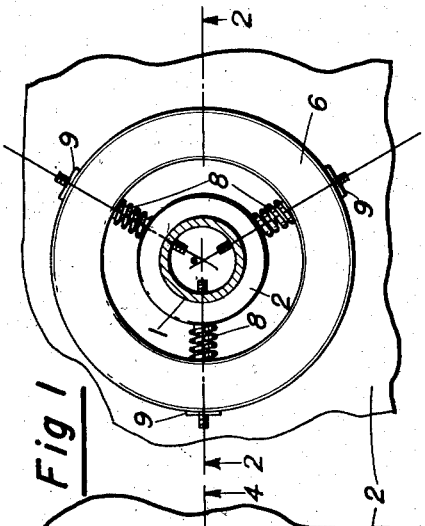
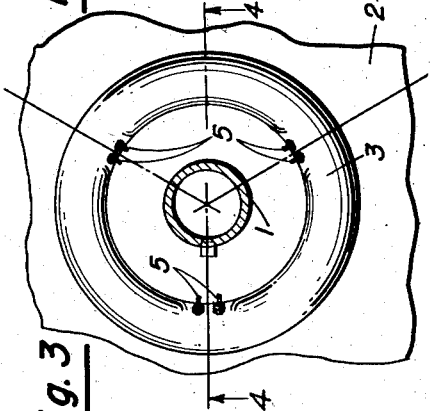
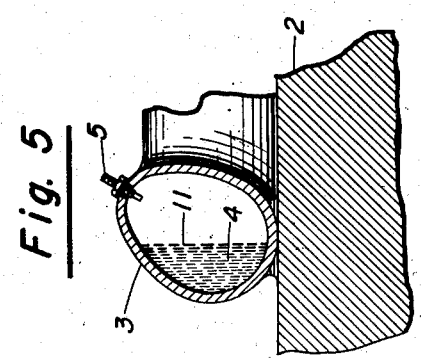
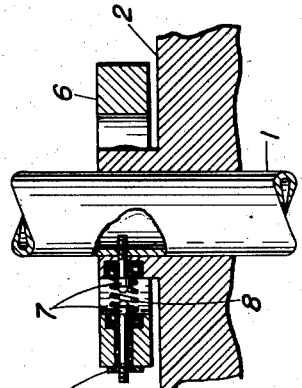
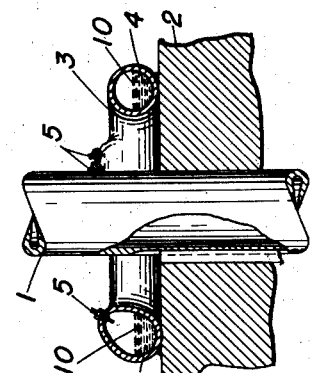
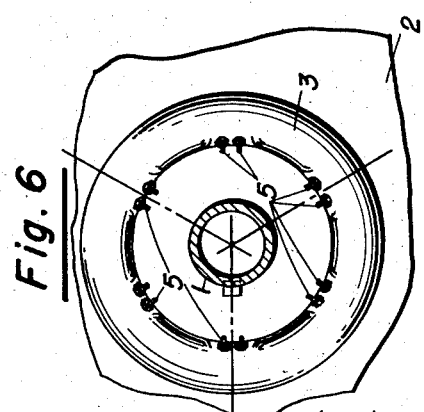
Inventor
John C. Childs
By Ralph L. Chappell
Attorney

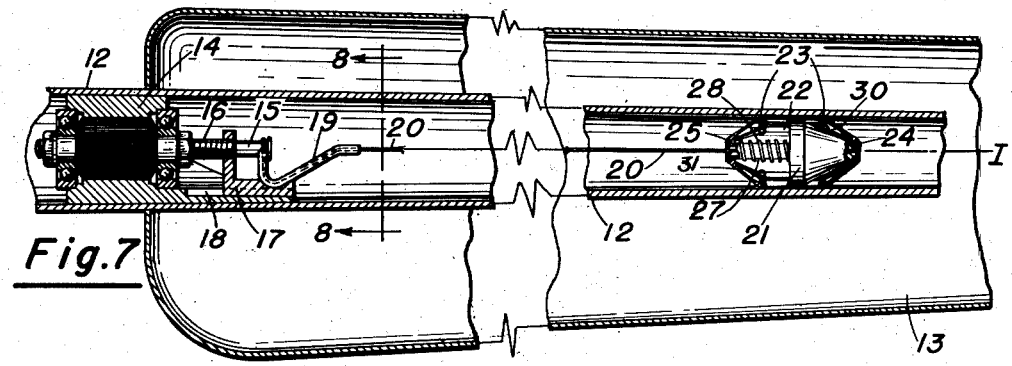
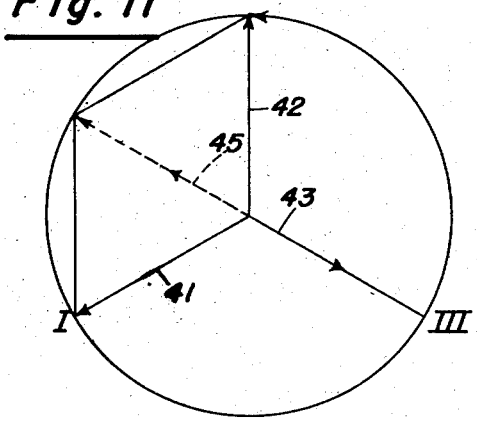
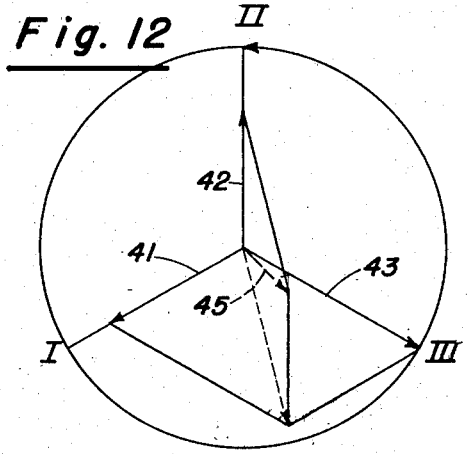
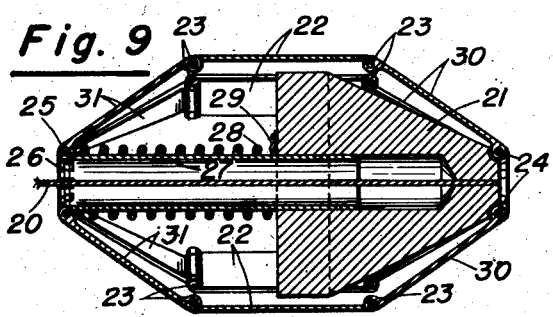
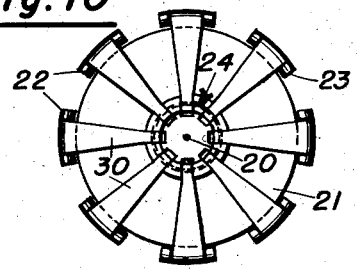
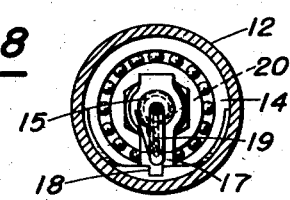
Inventor.
John C. Childs Nov. 27, 1951  J. C. CHILDS  2,576,105
BALANCING DEVICE FOR AIRCRAFT ROTORS
Filed Sept. 6, 1945  3 Sheets-Sheet 3

Inventor
John C. Childs
By Ralph L. Chappell
Attorney

Patented Nov. 27, 1951

2,576,105

UNITED STATES PATENT OFFICE 2,576,105

BALANCING DEVICE FOR AIRCRAFT ROTORS

John C. Childs, United States Navy

Application September 6, 1945, Serial No. 614,796

11 Claims. (Cl. 170—159)

(Granted under the act of March 3, 1883, as amended April 30, 1928; 370 O. G. 757)

The present invention relates to balancing means for automatically trimming unbalanced rotating shafts and comprises a device having weights adjustably mounted for radial movement with respect to the axis of a rotor shaft and control means operating in response to any unbalance in the rotor shaft due to displacement of its center of mass off its axis to move these weights radially inwardly or outwardly, to compensate for such displacement, and thereby to restore perfect rotational balance.

As an illustration of some of its many uses, it is here applied as a safety device to prevent gyration and possible destruction of a helicopter or autogiro in case of injury to one or more of its rotor blades throwing the rotor off balance.

Broadly, the object of this invention is to automatically maintain a kinetic balance in rotating assemblies having a plurality of arms wherein the arms are subject to a shift of their masses due to injury or some other disturbance.

A further object is to provide mass trimmers for rotor units, and means for moving said trimmers radially to retain the center of mass of the units on the axis of rotation regardless of any accidental shift of the parts of said units during rotation, so as to automatically maintain a perfect balance.

Other and more specific objects will become apparent in the course of the following detailed description of this invention, having reference to the accompanying drawings wherein:

Fig. 1 is a plan view of a mechanical switch of one form that may be used in the present invention;

Fig. 2 is a section thereof showing one of the pairs of contacts;

Fig. 3 is a mercury switch which may be used in place of the mechanical switch shown in Fig. 1;

Fig. 4 is a section thereof taken along the line 4—4 of Fig. 3, showing the mercury level assumed when the device is stationary;

Fig. 5 is an enlarged partial sectional view through the annular chamber of the device shown in Figs. 3 and 4 with the mercury in the position assumed during rotation of the rotor;

Fig. 6 is a modification of the switch shown in Figs. 3 to 5 wherein six pairs of contacts are used instead of three;

Fig. 7 is a sectional view through one of the spars of a typical rotor blade showing the ballast weight slidably mounted within the spar and operated by a selsyn motor;

Fig. 8 is a sectional view of the drum and fairlead end of the motor taken at the line 8—8 of Fig. 7;

Fig. 9 is an enlarged sectional view of the weight shown in Fig. 7;

Fig. 10 is an end view of this weight taken from the right end of Fig. 9;

Figs. 11 and 12 are vector diagrams showing the resulting eccentric forces created by an unbalance due to a change in the mass of one and two of the three blades of a three-bladed rotor respectively;

Figure 13:
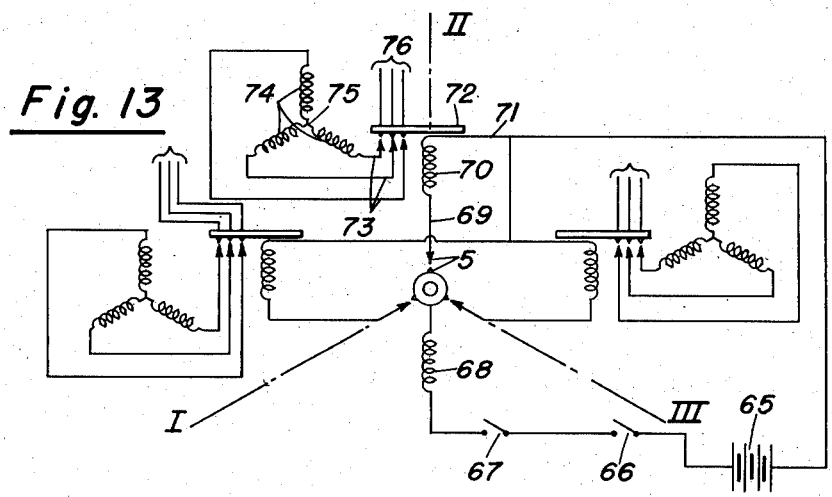
Figure 14:
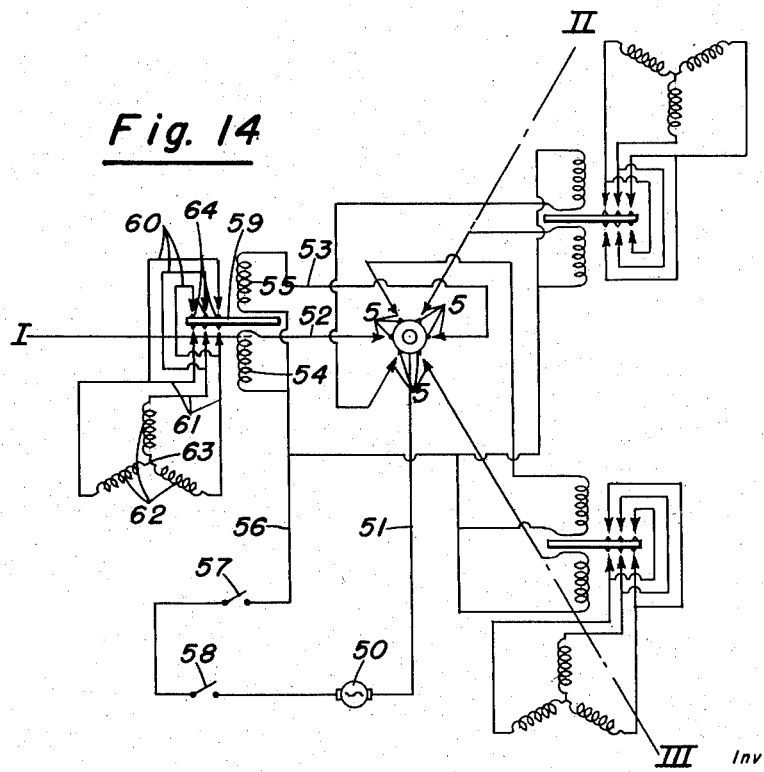

Fig. 13 is a schematic wiring diagram for a three-bladed rotor, or other rotor unit having three arms, showing the connections between the respective pairs of contacts and the relay switches for controlling the corresponding three-phase motors; and Fig. 14 is a similar schematic wiring diagram showing the connections between the six pairs of contacts distributed about the rotor axis and the respective double throw relay switches for operating the three-phase motors in either of two directions for shifting the corresponding ballast weights either inwardly or outwardly as required for maintaining a kinetic balance.

As applied to the rotor of a helicopter or autogiro type of aircraft, wherein the rotor has blades such as 13 which might accidentally become unbalanced, the trimmer weights 21 are slidably mounted within the blade spars, such as 12 shown in Fig. 7, which are usually tubular in form and slightly tapered toward their outer ends. Each weight 21 may be radially adjusted with respect to the axis of rotation by the aid of a power source such as an electric motor 14 controlled by switch means, detailed illustrations of which may be seen in Figs. 1 to 6, which are responsive to any unbalance of the rotor 2 on which they are mounted, so as to shift the corresponding weights 21 radially inwardly or outwardly to restore a balance to the rotor.

The switch means comprises a plurality of pairs of contact elements, as shown at 5 in Figs. 3 to 6, or at 7 in Fig. 2, distributed about the axis of the rotor and operated in response to an eccentric displacement of a ring 6 in the case of the mechanical switch, or an eccentric displacement of the entire rotor unit together with the annular chamber 3 in the case of the mercury switch, so that any unbalance in the rotor will cause one or more pairs of contacts to close and operate the corresponding motors 14 to move the respective weights 21 in the proper direction for restoring a balance, whereupon the contacts will again break and the rotor will continue in its normal balanced rotation.

In the mechanical form of switch shown in Figs. 1 and 2 there are three pairs of contact elements 7 distributed at 120° intervals about the axis of the rotor 2, and are operated by an eccentric displacement of the ring 6 which is resiliently concentrically mounted on the rotor 2 by means of the springs 8. Upon any unbalance in the rotor its resilient support will permit it to move into an eccentric position to close the contact elements on the side of the axis opposite to which the center of the mass had shifted, thus causing the power supply to move the trimmer weight or weights 21 on the same side radially outwardly or those on the opposite side inwardly, or both, until balance is again restored. Ring 6 centers itself in response to its resilient support and breaks the contact leaving the trimmer weights in a position corresponding to a perfect balance under the new rotor conditions.

The contact elements 5, as shown in Figs. 3 to 6, may be operated or closed by an intermediary conducting fluid 4, such as mercury, confined in an annular concentric chamber 3 on the rotor 2. Pairs of contacts are mounted on the wall of the chamber by insulating means out of contact with each other and are distributed at spaced intervals, internally of the level 11 of the rotating fluid, as shown in Fig. 5, as long as the rotor retains its balance. As soon as unbalance occurs in the rotor due to its center of mass shifting from its center of rotation, the fluid 4 will flow toward the portion of the chamber to which the mass has shifted and will fill up the entire section in that portion of the chamber. Thus the circuit is completed through the pair or pairs of contacts in said portion causing the power supplies to shift the trimmer weights 21, as above explained, to again bring about a perfect balance in the rotor, at which time the power supply is cut off so as to retain said balance.

Fig. 11 shows a force vector diagram representing the forces obtained in the blades of a three-bladed rotor wherein one of the blades III has sustained damage, whereby the force 43 therein is reduced to a value smaller than the forces 41 and 42 respectively in the other two blades. The resultant is an eccentric force 45, requiring movement of a mass along the axis of the blade III in a radially outward direction to bring the resultant force back to zero and thus reestablish a balance. The amount of this force is represented by the vector 45. As an alternative a pair of masses located along the axes of blades I and II could be moved radially inwardly a sufficient amount to bring the resultant back to zero.

In Fig. 12 the force vectors 41 and 42 along the axes of the blades I and II, respectively, are shown to be different from that along the axis of the blade III as a result of injury or some other disturbance within the blades I and II. In this case the resultant vector 45 shows a shift of the center of mass in a direction which does not correspond to any one of the three-blade axes and therefore cannot be compensated for by the movement of only one of the three trimmer weights mounted in the spars of the respective blades. The resultant eccentric force 45, therefore, has to be compensated by moving at least two of the weights, those in blades I and II, corresponding amounts radially outwardly to bring back the resultant to zero and thereby restore balance.

The contacts in the mercury switches are so arranged about the axis of the rotor that upon closing of any one of the pairs of contacts a relay switch controls the motor for moving the ballast or trimmer weights, located in the same direction from the axis of the rotor, radially inwardly, or for moving the weight on the opposite side radially outwardly. This is shown clearly in Figs. 13 and 14 where the contacts are shown in the circuits of the relays in their proper directional relations with respect to the axis of the rotor. One of the relay coils 54 or 55 in Fig. 14 for each switch 59 represents the field which moves the switch for operating the respective motor 14 in a direction to move the corresponding weight radially inwardly, the other outwardly. In this form of the device however it is necessary to use six pairs of contact elements, as shown in Fig. 6. The rotor blade axes are shown at I, II and III. The motors are of the three-phase type obtaining their power from the double throw switch 59 through contacts 64 and conductors 60 or 61, depending on the direction of operation desired, to the respective coils 62, said coils having their mutual connection at 63. The relay switches 59 are operated in one direction or the other by the respective operating coils 54 and 55 as previously mentioned for operating the motor in the proper direction. The operating coils are placed in the circuits including contacts 5 on opposite sides of the axis of the rotor as shown, the coil 54 being connected by conductor 52 to one pair of contacts in line with the blade I on one side of the axis while the coil 55 is connected by another conductor 53 to the pair of contacts 5 on the opposite side of the axis. The other ends of coils 54 and 55 are connected to the common power supply line 56, the latter being connected through the manual control switches 57 aond 58 to the power supply generator 50, there being a return line 51 connected back to the contact elements. The circuit shown in Fig. 13 may be used with a device having three pairs of contacts of either form, as shown in Figs. 1 to 5. The power supply for the operating coil circuit, such as 70, is in this case a battery 65 having manually controlled switches 66 and 67 similar to switches 57 and 58 in Fig. 14, one of which is the circuit switch, the other being an emergency switch for the pilot's use. The operating coils cause the relay switches 72 to close when necessary and to supply the power for the operating motors from the power source 76 through the conductors 73 to the three-phase coils 74, which have their mutual connection at 75.

The centrifugal force acting on the weight 21 in each blade spar is relied on for maintaining the actuating cable 20 taut. The motor 14 has a threaded lead screw portion 16 on its shaft connected to the runner 17, the end of the shaft acting as a drum 15 for the actuating cable which is passed through a fairlead 19 mounted on the runner. The runner 17 is mounted in a slidable guideway 18. The actuating cable 20 is attached to the trimmer weight element having the weight 21 mounted slidably on a sleeve 27. A series of elements, comprising middle sections 20 hingedly connected to end sections 30 and 31 by pins 23, are adapted to house weight 21. Sections 31 are pivotally connected to shoulder 26 at 25 and sections 30 are pivotally connected to weight 21 at 24. Tension spring 28 is mounted between the shoulder 26 and the inner end of the weight 21 at 29 for resiliently urging the sleeve into the weight 21 and forcing the member 22 radially outwardly to furnish the necessary frictional contact with the inside of the spar. Thus, as the motor is operated to turn in either one direction or the other by the control system, the balanced weights 21 are pulled inwardly by the motor or drawn outwardly by centrifugal force as they are released by the operation of the motor turning in reverse direction. The fairlead 19 guides the actuating cable 20 so that it will wind and unwind on the drum without tangling, as will be readily understood.

The forms of the device disclosed herein are merely illustrative of the invention and many modifications in the details thereof may be made without departing from the spirit and scope of this invention, as defined in the appended claims.

The invention described herein may be manufactured and used by or for the Government of the United States of America for governmental purposes without the payment of any royalties thereon or therefor.

What is claimed is:

1. A safety device for restoring balance to a rotating mass whose center may be accidentally shifted from the axis of rotation, comprising means mounted on said rotating mass including pairs of contacts distributed about its center of rotation, control circuits including these contact points for selective operation, power means controlled by each circuit, an auxiliary mass mounted for slidable adjustment radially of said rotating mass for each of said power means, said auxiliary masses being distributed about the center of the rotating mass and means responsive to any accidental shift of the center of mass from the axis of rotation to close the proper pair of contacts for operating the power means which will move the corresponding auxiliary mass or masses necessary for returning the displaced center of mass back to the center of rotation.

2. A balancing device for rotors of helicopters, autogiros and the like having a shaft and a plurality of blades thereon, comprising ballast weights mounted for radial adjustment within said blades and means responsive to any unbalance in the rotors due to damage of one or more of the blades for adjusting said ballast weights in the undamaged blade or blades to restore a balance in the operation of the rotor to prevent gyration and possible destruction of the craft as a result of a blade being accidentally injured in flight, said ballast weight adjustment means including a guide tube for the ballast weight in each blade, a reversible motor at the inner end of each tube, a drum shaft extending from the motor, and a cable attached to said drum shaft and to the ballast weight.

3. A balancing device for the rotor of a rotary wing aircraft having a shaft and a plurality of blades thereon, comprising a ballast weight mounted for radial adjustment within each of said blades and means responsive to any unbalance in said rotor due to damage of one or more of said blades for automatically adjusting said ballast weights to restore a balance in the operation of said rotor, said means including a reversible motor drivingly connected to each of said weights and means responsive to said unbalance for automatically actuating said motor.

4. A safety device for restoring balance to a rotating mass whose center may be accidentally shifted from the axis of rotation, comprising a plurality of auxiliary masses mounted on said rotating mass for slidable adjustment radially thereof, motive means drivingly connected to each of said auxiliary masses, a control circuit for each of said motive means including at least one contact mounted on said rotating mass, and means responsive to accidental shift of the center of said rotating mass from the axis of rotation to close the proper control circuits for operating said motive means to move the associated auxiliary mass or masses to thereby return the displaced center of mass to the axis of rotation.

5. A safety device for restoring balance to a rotating mass, comprising a plurality of auxiliary masses mounted on said rotating mass for radial adjustment with respect thereto, motive means for adjusting each of said auxiliary masses, and means responsive to any accidental shift of the center of said rotating mass from its axis of rotation for operating said motive means to move the associated mass or masses for returning the center of said rotating mass back to the axis of rotation.

6. A device for automatically balancing in flight the rotor of a rotary wing aircraft having a shaft and a plurality of blades thereon, said device comprising a ballast weight adjustably mounted within each of said blades for movement toward or away from said shaft, means mounted on said rotor for adjusting the weights and means responsive to any unbalance in said rotor for automatically actuating said adjusting means to adjust said weights to restore a balance in the operation of said rotor, said responsive means including a mass resiliently mounted on said shaft in concentric spaced relation therefrom, a control circuit for said adjusting means with a plurality of contacts on said mass, the proper contact being adapted to close the proper control circuit for said adjusting means upon an unbalanced condition in the rotor.

7. A safety device as in claim 5 wherein said responsive means includes a plurality of switches concentrically arranged about said shaft, a control circuit connecting one of said switches with each of said motive means, said control circuit being such that it causes one or more of said masses to move in a direction away from said axis of rotation and one or more of said masses to move in a direction towards said axis of rotation.

8. A balancing device for rotors of helicopters, autogiros and the like having a shaft and a plurality of blades thereon, comprising ballast weights mounted for radial adjustment within said blades, motive means operatively connected to said ballast weights for providing said radial adjustment, control means mounted on said shaft for operating said motive means, said control means including an annular ring with fluid therein, a plurality of switches mounted on said ring adapted to be closed by said fluid to operate said motive means when a pre-determined unbalance in the rotor occurs so as to restore a balance in the operation of the rotor.

9. A balancing device for the rotor of a rotary wing aircraft having a shaft and a plurality of blades thereon, comprising a ballast weight mounted in each of said blades for adjustment radially from the axis of rotation of said shaft to variable positions between inner and outer limits, motive means drivingly connected to each of said ballast weights for said adjustment, a control circuit for said motive means including a plurality of contacts concentrically arranged around said shaft, and means responsive to shift of the mass center of said shaft and blades from the axis of rotation to close the proper control circuits for operating said motive means to move the associated ballast weight to one of said variable positions to thereby return the displaced mass center to the axis of rotation.

10. A safety device as in claim 5 wherein said rotating mass is the rotating wing of a rotary wing aircraft and said motive means includes a reversible motor having a reel thereon, and a line connected to said auxiliary mass and adapted to be wound on said reel, the rotation of said motor in one direction causing said auxiliary mass to be pulled toward its axis of rotation and the rotation of said motor in the other direction permitting said auxiliary mass to move outwardly from said axis of rotation due to centrifugal force.

11. A safety device as in claim 3 wherein each of said reversible motors is mounted adjacent the root of its associated blade and having a reel thereon, the rotating axis of said reel extending longitudinally of said blade, said connecting means between the motor and ballast weight comprising a line adapted to be wound on said reel upon rotation of said motor in one direction and unwound from said reel upon rotation in the other direction, and brake means on each of said weights for maintaining them in an adjusted position.

JOHN C. CHILDS.

REFERENCES CITED

The following references are of record in the file of this patent:

UNITED STATES PATENTS

| Number | Name | Date |
|---|---|---|
| 2,076,090 | Myers | Apr. 6, 1937 |
| 2,238,989 | Bradbury | Apr. 22, 1941 |
| 2,336,429 | Wenger | Dec. 7, 1943 |
| 2,339,624 | Davis | Jan. 18, 1944 |
| 2,361,071 | Vang | Oct. 24, 1944 |
| 2,362,804 | Cox | Nov. 14, 1944 |
| 2,441,152 | Kelleher et al. | May 11, 1948 |